Aug. 14, 1951          C. PYLE          2,564,078

FRACTIONATING COLUMN

Filed Dec. 16, 1947          5 Sheets-Sheet 1

INVENTOR.
Cyrus Pyle

BY

ATTORNEY

Patented Aug. 14, 1951

2,564,078

UNITED STATES PATENT OFFICE 2,564,078

FRACTIONATING COLUMN

Cyrus Pyle, New Castle, Del., assignor to E. I. du Pont de Nemours & Company, Wilmington, Del., a corporation of Delaware Application December 16, 1947, Serial No. 791,961

4 Claims. (Cl. 261—113)

This invention relates to fractional distillation, and particularly relates to an improved construction of sieve-plate fractionating column for separating the components of so-called "perfect" solutions where there is a substantial pressure drop between the bottom and top plates of the column.

A construction of sieve-plate fractionating columns for the separation of the components of "imperfect" solutions has been previously disclosed and claimed in my U. S. Patent 2,201,502 issued May 21, 1940. I have now discovered that sieve-plate columns can be advantageously used for the separation of the components of "perfect" solutions under certain conditions which are hereinafter described.

As defined in U. S. Patent 2,201,502 the term "imperfect" as applied to solutions denoted those mixtures of miscible liquid components in which the product of the latent heat of evaporation $(r)$ and the square root of the vapor density $(\sqrt{d})$ of one component will differ by at least 20% from the same product for another component. Other mixtures to which this condition does not apply were termed "perfect" solutions.

This invention relates exclusively to "perfect" solutions where the pressure drop through a fractionating column is sufficient to change the product $r\sqrt{d}$ for a single component by more than 20% between the bottom and the top of the column, even though the product $r\sqrt{d}$ for one component does not differ substantially from the product $r\sqrt{d}$ of the other component at any given point within the column. This invention is particularly applicable but is not confined to the separation of isomeric heat-sensitive materials, for the reason that such materials must be distilled at reduced pressures and temperatures to minimize thermal decomposition. Sieve-plate columns modified in accordance with this invention are ideally suited to such service because they provide a high overall separating efficiency with only a relatively low total pressure drop.

As described in U. S. Patent 2,201,502 sieve-plate fractionating columns comprise a cylindrical or conical column in which a sufficient number of perforated plates are provided to effect the desired degree of separation. These plates are positioned substantially level and usually equidistant apart, and each plate is provided with a relatively large number of small openings (0.08 inch to 0.25 inch in diameter) for the upward passage of vapors therethrough. Liquid is supplied to each of the plates, and a liquid layer is maintained over all the openings so that the vapors contact the liquid in passing through the openings. Each plate is provided with a "downpipe," i. e., a short open pipe terminating flush with the top of the plate, the upper opening being encircled by a low dam or weir member. The weir member maintains a predetermined liquid level on the plate while the downpipe serves as a passage for the downward flow of liquid to the next succeeding plate.

In separating the liquid components of a solution in such a column, the vapors of the less volatile liquid component or components tend to condense and flow back as reflux liquor in seriatim from plate to plate through the downpipes. The vapors of the more volatile liquid tend to pass upward through the numerous sieve-holes and support a layer of condensed liquid on each of the perforated plates. By virtue of differential condensation and vaporization which results from passing the rising vapors through liquid successively richer in the more volatile component, the vapors emerging from the top of the column are largely freed from the less volatile liquid components and they are then caused to condense. A portion of the condensate is removed as product and the remainer returned as reflux to the top plate of the column.

Except as provided in U. S. Patent 2,201,502, relating to imperfect solutions exclusively, sieve-plate fractionating columns used heretofore have employed plates carrying holes of about the same size and number throughout the entire column, regardless of the type of solution being fractionated.

This practice has had a number of disadvantages to the correction of which this invention is directed.

In the operation of sieve-plate fractionating columns there is usually a substantial pressure drop from the bottom plate to the top plate of the column. The operating efficiency of sieve-plate columns is dependent upon a proper correlation of such pressure drop and the velocity of the upsweeping vapors through any given sieve-plate under consideration. If the velocity of vapor flow is too high, entrainment of down flowing liquid will occur with a resultant decrease in separating efficiency. If the velocity of vapor flow is too low, liquid will flow through the holes in the sieve-plate without being supported by the vapor pressure head, and contacting action and separating efficiency will again decrease. Where temperature-sensitive materials are being distilled a third condition is important, namely, that a minimum pressure drop be maintained across each plate of the column, to the end that a high degree of separation may be attained while still protecting the treated materials against thermal decomposition. All three of the foregoing conditions are correlated and preserved according to this invention by a predetermined alteration of the hole area of the sieve-plates over the entire column, all in the manner hereinafter set forth in the detailed description and in the following drawings in which:

This invention will be described in detail with reference to its application to the separation of the components of a binary mixture of isomeric substituted hydrocarbons; however, it will be understood that the invention is equally applicable to ternary and even more complex mixtures, and also to other perfect liquids than isomers.

The continuous separation of the components of a 50 mol percent mixture of meta and para nitrotoluenes into products of 90% mol purity will now be described with reference to Figures 1, 2, and 3.

The nitrotoluenes are relatively temperature-sensitive materials which must be fractionally distilled at sub atmospheric pressures. The boiling point of meta nitrotoluene is 232° C. at atmospheric pressure, while the para compound boils at 237° C. at atmospheric pressure. In this case the para component will be the bottom product and the meta component the top product.

Figure 1:
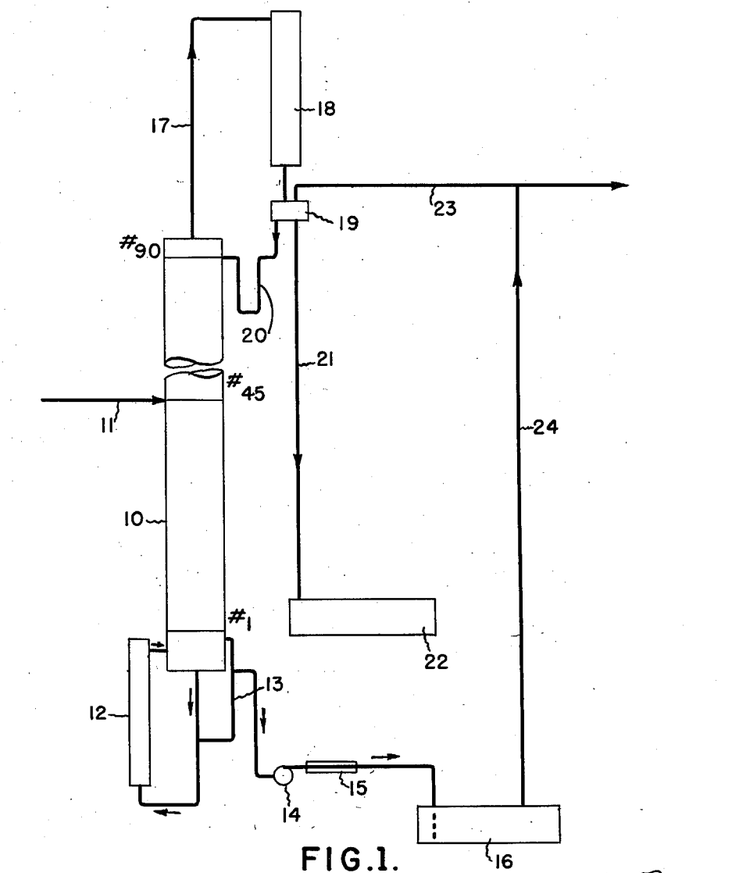
Figure 1 is a diagrammatic representation of an arrangement of equipment for the separation of the components of a 50-50 mol percent mixture of meta nitrotoluene and para nitrotoluene.

The foregoing separation may be effected by an arrangement of equipment such as that shown in Figure 1, wherein 10 is a sieve-plate distillation column fitted with a total of 90 plates, of which only Nos. 1, 45, and 90 are indicated for purposes of simplicity.

The mixed feed is supplied to column 10 through line 11 entering at plate No. 45. Heat is supplied to the liquid material by circulating it through external shell and tube type heater 12 and returning the heated material to the base of the column.

The higher boiling para component fraction is withdrawn through overflow line 13 by pump 14 after which it passes through shell and tube type cooler 15 to storage vessel 16. The lower boiling meta component fraction is withdrawn through overhead line 17, shell and tube type condenser 18 and reflux regulating box 19, from whence a desired quantity may be returned as reflux through line 20 while the balance passes through line 21 to storage vessel 22. The upper and lower confines of the distillation system are kept at the desired sub atmospheric pressures by vacuum lines 23, leading to reflux regulator 19, and 24, leading to the para component fraction storage vessel 16, respectively.

By the application of the known theories of distillation (refer W. L. McCabe and E. W. Thiele, "Graphical design of fractionating columns," Journal of Industrial and Engineering Chemistry, vol 17, page 605 (1925), and John H. Perry, "Chemical Engineers' Handbook," pages 1407–08, second edition, McGraw-Hill Book Co. (1941)) it can be determined that 90 actual plates will be required to effect the desired degree of separation.

Due to considerations of thermal instability and limitations of heating temperature applicable to the specific liquid mixture it is determined that the safe allowable absolute pressure at the base of the column should not exceed 200 mm. of Hg. Choosing 200 mm. of Hg as the bottom plate pressure a practical top plate pressure of about 20 mm. of Hg may be chosen, based on commercially available evacuation equipment, structural strength considerations and other factors of economy. The pressure differential thus established will be 2 mm. of Hg, or 1.07 inches of water, across each of the 90 sieve-plates of the column.

Assuming that the volume of production will require a boil up, or supply of vapor to the top plate of the column of 1710 lb./hr., it is first necessary to establish the proper column diameter. In this determination the relationship expressed by the following equation, familiar to persons skilled in the distillation art, may be employed:

(1) $$V_s^2 d = K_s$$

where $V_s$=the linear vapor velocity in feet per second based on the superficial column area, this area being the entire cross-sectional area of a column containing no sieve-plates, $d$=the density of the vapor existing at any point under consideration, and $K_s$ is a constant correlating the effects of vapor composition which is defined by plate spacing and plate design variables.

Since the vapor velocity will depend on the superficial column area ($A_s$), and on the volumn of vapor ($Q$) passing through the column in a unit of time, for instance in cubic feet per second, the formula $V_s^2 d = K_s$ can be expressed as, $$\frac{Q^2}{A_s^2} d = K_s$$

or $$\sqrt{K_s} = \frac{Q}{A_s}\sqrt{d}$$

The most important single factor in the selection of a suitable value of $K_s$ is the distance of sieve-plate spacing, the selection of which depends upon the available head room for the fractionating column, the entrainment occasioned by the spacing and like considerations. Based upon known practice, with particular reference to support of liquid on the plate and entrainment of liquid, a practical plate spacing in the instant case may be about 7 in. at which the value $K_s=0.64$ (or $\sqrt{K_s}=0.80$) at the top of the column. The column diameter may then be computed as 36 in., from the equation $$\sqrt{K_s}=\frac{Q}{A_s}\sqrt{d}$$

as applied to conditions existent at the top of the fractionating column.

It may be determined, from data published in the literature, that the particular binary-isomer mixture under consideration will have the following $r\sqrt{d}$ products under the column pressures of 200 mm. of Hg at the bottom and 20 mm. of Hg at the top:

*Top of column*

Meta isomer $r\sqrt{d}=14.45$
Para isomer $r\sqrt{d}=14.55$

*Bottom of column*

Meta isomer $r\sqrt{d}=38.3$
Para isomer $r\sqrt{d}=39.8$

It will be apparent that the meta and para components are not imperfect liquids within the meaning of the definition, since the $r\sqrt{d}$ products of each do not differ by a factor of 20% at any given point. However, due to the variation of $r\sqrt{d}$ from the bottom to the top of the column, the differential in this characteristic for a single component greatly exceeds 20% over these two points.

Since the value of $d$ has been shown to vary greatly from the bottom to the top of the column, it will be apparent that $K_s$ will also vary in some degree dependent upon the variation of $d$, and also upon the concentration and temperature distribution throughout the column, the absolute pressure existent at any given point in the column, and the variation in latent heat of the several components as a function of temperature. A preliminary step to design, therefore, requires the preparation of a plot of $\sqrt{K_s}$ values against plate location under the particular limiting pressure drop, in this case 2 mm. of Hg per plate, and the calculated concentration and temperature gradients existing through the column. Figure 3 represents such a plot for the conditions of this example.

Figure 2:
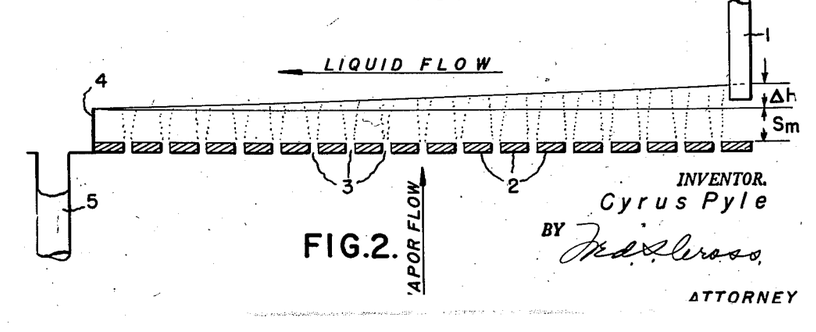
Figure 2 is a diagrammatic representation of a single sieve-plate supporting a layer of refluxing liquid opposed to the passage of upwardly flowing vapors under typical operating conditions.

Referring to Figure 2, reflux liquid is continuously supplied through downcomer pipe 1 leading from the sieve-plate immediately above to sieve-plate 2. This liquid presents a barrier to the passage of upsweeping vapors through holes 3, the vapors supporting the liquid by the force of pressure head while being thoroughly scrubbed in transit through the liquid to the next sieve-plate in the series. There is a small difference in the depth of the liquid layer on plate 2 between the point of its entry and the point of its exit over weir 4 leading into downcomer 5, because of the hydraulic gradient or liquid buildup between the point of liquid entrance and the point of liquid draw-off. The additional head due to this hydraulic gradient is designated $\Delta H$, which varies from a maximum at the point of entrance to zero at the point of exit.

A certain minimum liquid seal $S_m$ is required to secure efficient distillation separation by the contact of vapors with liquid, and it has been determined by experiment that $S_m$ must be equivalent to about 0.6 in. of water, which will be considered the total liquid seal to be maintained at the liquid exit point adjacent to overflow weir 4. The average seal, $S_{av}$, across the entire sieve-plate, may then be equated against its component seals by the expression:

(2) $$S_{av}=S_m+\frac{\Delta H}{2}$$

The hydraulic gradient, $\Delta H$, is dependent upon the rate of reflux return necessary to effect the distillation separation required and upon the length of the liquid path across the plates. For the case under consideration it may be determined by experiment that $\Delta H$ is equivalent to 0.2 in. of water. Knowing the value of $S_m$ (0.6 in. of water), $S_{av}$ may now be determined from Equation 2 and is found to be 0.7 in. of water.

It will be apparent that the following expression for total pressure drop is generally applicable to any sieve-plate:

(3) $$\Delta p=\Delta pd+S_{av}$$

where $\Delta p=$ the total pressure drop across the operating sieve-plate, $\Delta pd=$ the resistance of the dry plate (supporting no liquid) to vapor passage, and $S_{av}=$ the resistance of the average seal.

In this example the allowable $\Delta p$ has already been determined to be 1.07 in. of water for each sieve-plate of the column. If $S_{av}$ equals 0.7 in. of water the value of $\Delta pd$ is determined from equation 3 to be 0.37 in. of water, or say about 0.35 in. of water expressed in round numbers.

It is desirable to employ somewhat standard hole sizes in the construction of all sieve-plates for reasons of economy in fabrication. A common size sieve-plate hole is ⅛ in. in diameter. It has been learned that, to maintain stable operating conditions on each sieve-plate, $\Delta pd$, the dry plate resistance, should at least equal, or preferably slightly exceed, the hydraulic gradient, $\Delta H$. A satisfactory low limit $\Delta pd$ value for the column under consideration is, therefore, equivalent to about 0.25 in. of water. However, it has already been determined that an average $\Delta pd$ of 0.35 in. of water may be maintained across each single sieve-plate. A high limit $\Delta pd$ may now be calculated such that the desired average $\Delta pd$ will remain at 0.35 in. of water, and this high limit of $\Delta pd$ is determined to be 0.45 in. of water. Satisfactory operation from the standpoints of both plate stability and distillation efficiency will thus result if the average $\Delta pd$ is maintained at about 0.35 in. of water over any chosen set of plates, even though the $\Delta pd$ value for individual sieve-plates of the set may vary anywhere from the lower limit of 0.25 in. of water to the upper limit of 0.45 in. of water. This fact makes it unnecessary to vary the free area of the holes of each individual sieve-plate so long as the foregoing correlation is preserved for any given set of sieve-plates, and greatly reduces the cost of individual plate fabrication.

It is convenient to express the satisfactory operating $\Delta pd$ range in terms of the value $\sqrt{K}$ which may be determined from the following expression:

(4) $$K = V^2 d$$

where $V$=the linear velocity of the vapor in feet per second through the holes of the sieve-plate, $d$=the density of the vapor passing through the holes, and $K$ is a constant, correlating the effect of variations in vapor composition which is defined by plate-design variables. In this connection $\Delta pd$ may be determined experimentally by direct measurement of the pressure drop across a dry plate under any specific conditions of vapor velocity and vapor density, or $\Delta pd$ may be calculated with reasonable accuracy for each given condition if the flow discharge coefficients of the sieve-plate holes are known.

Figure 4:
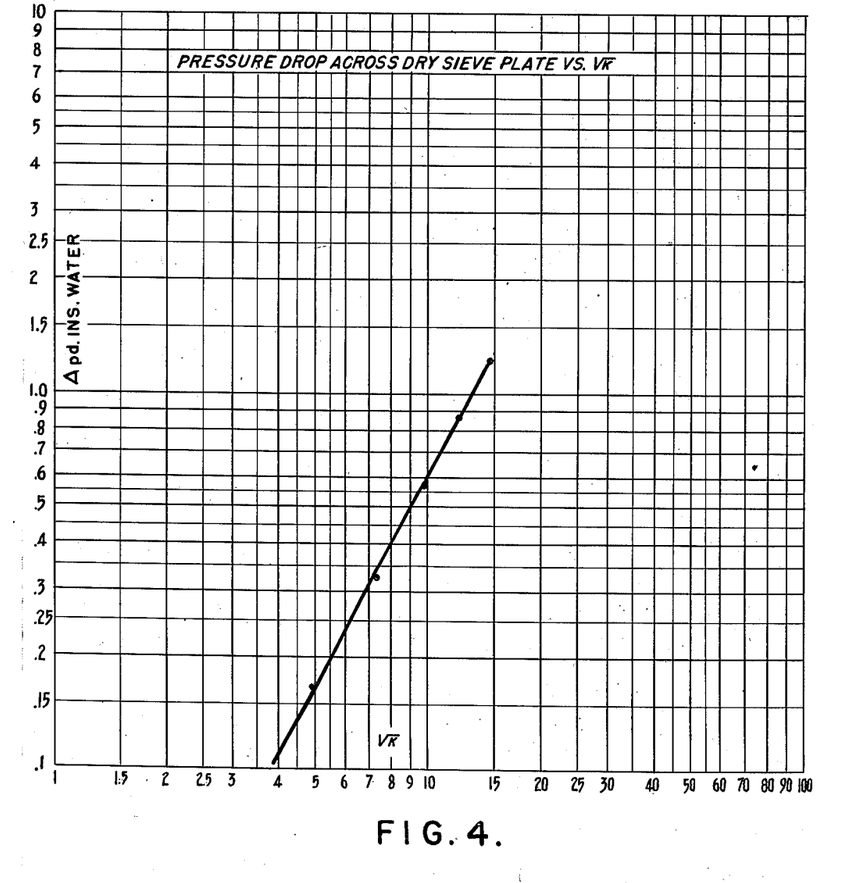
Figure 4 is a graphical representation of the variation of the dry sieve-plate pressure resistance in relation to $\sqrt{K}$.

Figure 4 is a plot of the value $\sqrt{K}$ against $\Delta pd$ expressed in inches of water. At the low $\Delta pd$ limit of 0.25 in. chosen for this example $\sqrt{K}$ may be read from Figure 4 as equal to 6.2. Similarly, $\sqrt{K}$ at the high $\Delta pd$ limit of 0.45 in. is found to be 8.5. The desired correlation of $\Delta pd$ to be preserved may therefore be attained by maintaining $\sqrt{K}$ at some value between 6.2 and 8.5 for any given set of sieve-plates.

The value $K$ is related to $K_s$ in the manner set forth in the following expression:

(5) $$K = \frac{K_s}{(A_0)^2}$$

where $A_0$=the fractional hole area of the sieve-plate.

Therefore, knowing the value of $K_s$ at any particular plate in the column and the permissible limits of $K$, it is then possible to determine the particular hole area for that set of plates wherein $\Delta pd$ is maintained at an average of 0.35 in. of water. For example, from Figure 3 it may be determined that $\sqrt{K_s}=0.80$ at plate No. 90. If plate No. 90 is considered the last sieve-plate of a particular series of sieve-plates for which the average $\Delta pd$ of 0.35 in. of water is to be preserved, plate No. 90 may have a $\Delta pd$ at the high limit, that is, 0.45 in. of water or a $\sqrt{K}$ value of 8.5. The fractional hole area will then be:

$$A_0 = \frac{\sqrt{K_s}}{\sqrt{K}} = \frac{0.80}{8.5} = 0.094 = 9.4\%$$

Retaining the same fractional hole area it will be evident that as $\sqrt{K_s}$ decreases progressively from the top plate to plates below the top plate (refer Figure 3) $\sqrt{K}$ correspondingly decreases. The factor $\sqrt{K}$ may be permitted to decrease to a minimum value of 6.2 while still maintaining the optimum average $\Delta pd$ at 0.35 in. of water. The value of $\sqrt{K_s}$ where $\sqrt{K}=6.2$ and $A_0=0.094$ is calculated to be 0.585, and, from Figure 3, it is determined that such a condition is reached at sieve-plate No. 78. Thus the series of sieve-plates running from No. 78 to No. 90 inclusive may all have the same hole area of 9.4% and will still operate within the range of $\Delta pd$ which gives the best possible operating conditions.

Having attained sieve-plate No. 77 it is desirable to select a new hole area which will yield a $\sqrt{K}=8.5$ and still preserve the desired $\Delta pd$ correlation for a second series of sieve-plates. At plate No. 77, $\sqrt{K_s}=0.58$ (refer Fig. 3), therefore, $$A_0 \text{ for this plate} = \frac{0.58}{8.5} = 0.068$$

or 6.8%. This new area of 6.8% may be used until $\sqrt{K}=6.2$, as in the first series, at which point $\sqrt{K_s}=0.068 \times 6.2$ or 0.422, which condition is reached at sieve-plate No. 57 (refer Fig. 3). The second series of sieve-plates, therefore, includes plates No. 57 to 77 inclusive.

The hole area of the third series of sieve-plates is determined in the manner already described by fixing the value of $\sqrt{K}=8.5$ at sieve-plate No. 56, ascertaining the value of $\sqrt{K_s}$ at sieve-plate No. 56 (0.415 from Fig. 3) and calculating $A_0$, which is found to be 4.9%. Again, the value of $\sqrt{K_s}$ for the lower sieve-plate of the third series is calculated as $6.2 \times A_0 = 6.2 \times 0.049 = 0.30$, which determines the precise location of the bottom plate of the third series as plate No. 7, by reference to Figure 3.

Since the first three series of sieve-plates comprise the top eighty-four plates of the column, only the six lowermost plates remain to be designed in accordance with the preselected correlation of $\Delta pd$ for optimum operation. The small number of plates remaining cannot be readily treated by the method used for the larger series; however, a practical approximation method has proved entirely satisfactory in this case.

Figure 3:
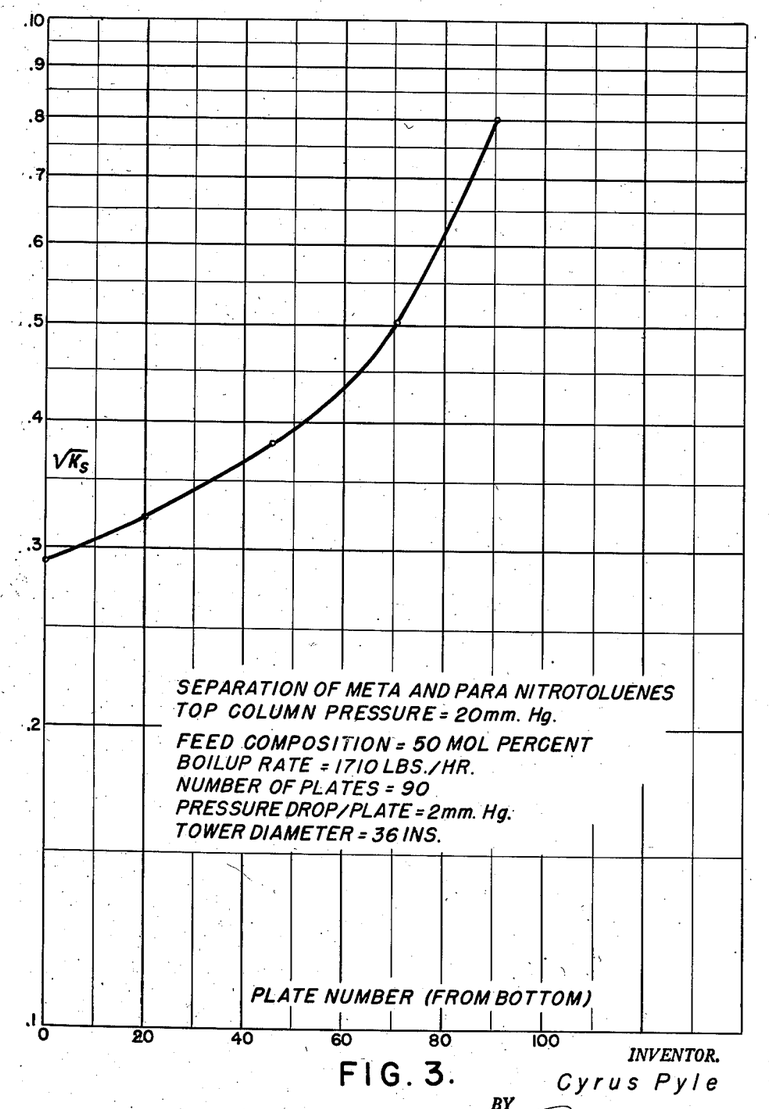
Figure 3 is a graphical representation of the variation of $\sqrt{K_s}$ in relation to sieve-plate location in the distillation of a binary mixture of the isomers meta and para nitrotoluene conducted in a 90 plate column.

From Figure 3, the value of $\sqrt{K_s}$ at sieve-plate No. 6 is determined to be about 0.30. The average value of $\sqrt{K}$ at which the value of $\Delta pd$ will be 0.35 in. of water will be the arithmetic average of the maximum permissible value of $\sqrt{K}$, which is 8.5, and the minimum permissible value of $\sqrt{K}$, which is 6.2. The average value of $\sqrt{K}$ thus equals 7.4, approximately. Using the average value of $\sqrt{K}$ and the value of $\sqrt{K_s}$ determined for sieve-plate No. 6 from Figure 3, the sieve-plate hole area, $A_0$, is calculated to be 0.0405 or 4.05%. The curve of Figure 3, extrapolated to the abscissa corresponding to a zero plate number, reveals that the value of $\sqrt{K_s}$ equals 0.29 at this point, whereupon the $\sqrt{K}$ will equal 7.15 and $\Delta pd$ will be equivalent to approximately 0.32 in. of water, which is close enough to the average value of 0.35 in. of water to be entirely satisfactory in operation.

In summary, the desirable correlation of $\Delta pd$ with the ninety plates of the distillation column of this example is achieved by varying the free area of the sieve-plate holes only four times throughout the entire column, the absolute values of hole area for each of the four series of sieve-plates being tabulated as follows:

| Plate Numbers | Hole Area in Relation to Total Sieve-Plate Area |
|---|---|
| | Per cent |
| 1-6 inclusive | 4.05 |
| 7-56 inclusive | 4.9 |
| 57-77 inclusive | 6.8 |
| 78-90 inclusive | 9.4 |

Figure 6:
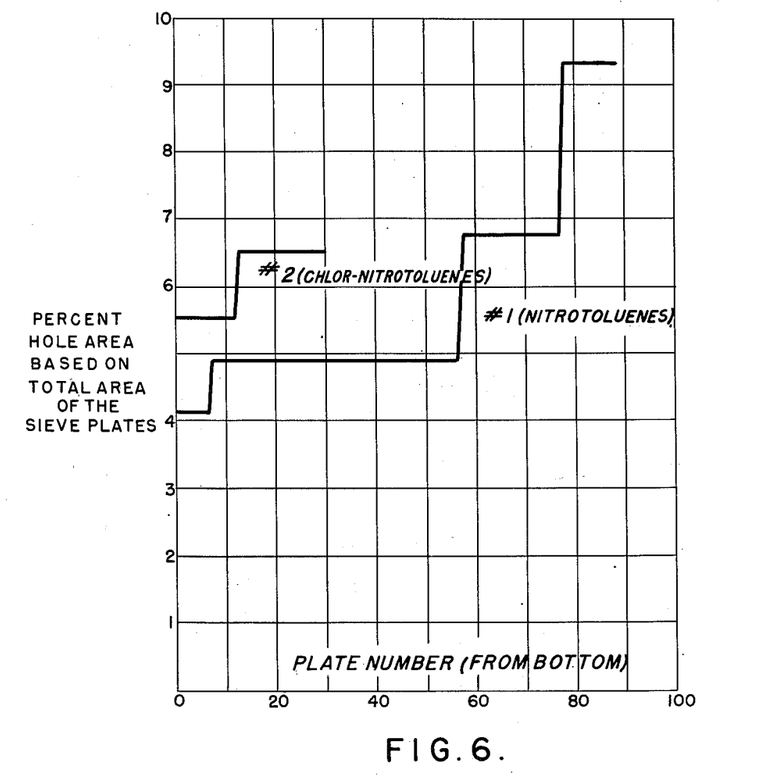
Figure 6 is a graphical representation of the variation of sieve-plate hole area in relation to the number of sieve-plates in the distillation separation of the components of the binary mixtures meta and para nitrotoluene and 4-chloro nitrotoluene and 6-chloro nitrotoluene, respectively.

The foregoing tabulation is represented graphically by plate No. 1, Figure 6.

The binary mixture comprising the isomers 6-chloronitrotoluene and 4-chloronitrotoluene is another example of a mixture of isomeric compounds of the class defined as perfect liquids which may be efficiently separated in accordance with this invention.

The chloronitrotoluenes are, like the isomeric nitrotolenes of the preceding example, relatively temperature-sensitive materials which also must be distilled at subatmospheric pressures.

The boiling point of 6-chloronitrotoluene is 246° C. at atmospheric pressure, while 4-chloronitrotoluene boils at 250° C. at atmospheric pressure. In this case the 4-chloronitrotoluene component will be the bottom product fraction and the 6-chloronitrotoluene component the top product fraction.

In this example it will be assumed that it is desired to separate a 50 mol percent mixture of 6-chloronitrotoluene and 4-chloronitrotoluene into products of 95% mol purity by batch distillation conducted in a sieve-plate fractionating column. Safe absolute operating pressures are determined experimentally and found to be approximately 95 mm. of Hg at the bottom of the column and 35 mm. of Hg at the top of the column, representing an allowable pressure drop of 60 mm. of Hg from the bottom to the top.

As in the preceding example the products $r\sqrt{d}$ are substantially the same at both the top and the bottom of the column, the top value being about 16.8 for each component while the bottom value is 25.5. The variation between the products $r\sqrt{d}$ at these two points is, however, considerably greater than 20%.

By the application of the general principles of distillation practice it is determined that thirty sieve-plates will be required to effect the desired degree of separation. It is assumed that the volume of production will require a boilup of 3000 lb./hr. at the top of the column.

Based upon an economical sieve-plate spacing of about 6 in. between adjacent plates the value of $\sqrt{K_s}$ at the top of the column may be chosen at about 0.55 whereupon the diameter of the column may be calculated by Equation 1 to be 48 in.

Figure 5:
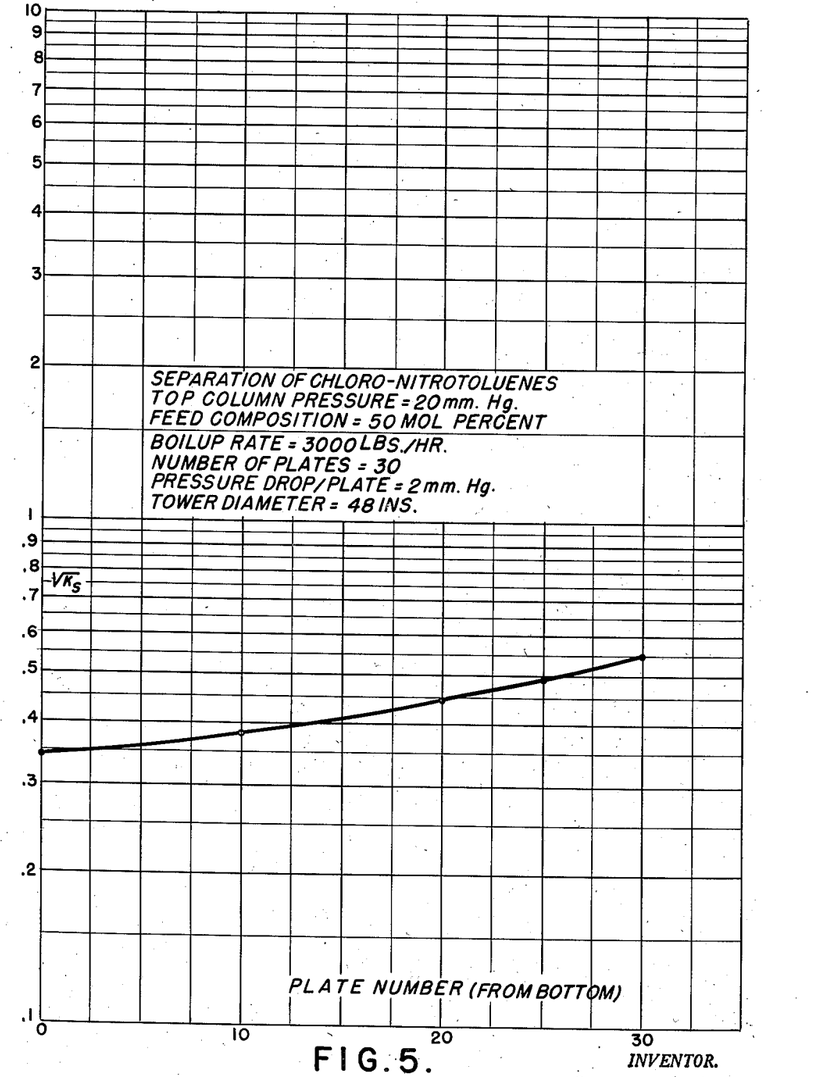
Figure 5 is a graphical representation of the variation of $\sqrt{K_s}$ in relation to sieve-plate location in the distillation of a binary mixture of the isomers 4-chloro nitrotoluene and 6-chloro nitrotoluene conducted in a 30 plate column.

Figure 5, showing the variation of $\sqrt{K_s}$ in relation to plate number, may next be plotted from calculations of the temperature and pressure conditions existing at various points throughout the fractionating column.

In this example, the following values of the various factors employed in the first example are used:

$S_m$ is equivalent to 0.6 in. of water.
$\Delta H$ is equivalent to 0.2 in. of water.
$S_{av}$ is equivalent to 0.7 in. of water.
$\Delta p$ is equivalent to 1.07 in. of water per plate.
Average $\Delta pd$ is equivalent to 0.35 in. of water.
Minimum permissible $\Delta pd$ is equivalent to 0.25 in. of water.
Maximum permissible $\Delta pd$ is equivalent to 0.45 in. of water.
Sieve-plate hole diameter = ⅛ in.
Maximum permissible value of $\sqrt{K}$ = 8.5.
Minimum permissible value of $\sqrt{K}$ = 6.2.

Employing the identical procedure of the first example hereinbefore described, the sieve-plate hole areas may be correlated with the location of the sieve-plates as follows:

On sieve-plate No. 30 the value of $\sqrt{K_s}$ = 0.55. From Equation 5, $$A_0 = \frac{\sqrt{K_s}}{\sqrt{K}} = \frac{0.55}{8.5} = 0.0647 = 6.47\%$$

the hole area of the first series of sieve-plates.

The hole area of 6.47% is maintained for all plates below plate No. 30 until the value of $\sqrt{K}$ decreases to 6.2. At this point $$\sqrt{K_s} = 0.0647 \times 6.2 = 0.40$$

From Figure 4 the exact location of this condition is found to be at plate No. 13. Therefore, plates No. 13 to No. 30, both inclusive, constitute the first sieve-plate series.

Referring again to Figure 5 the value of $\sqrt{K_s}$ on plate No. 12 is found to be about 0.39. Using the maximum permissible value of $\sqrt{K}$ = 8.5 the value of $A_0$ for plate No. 12 is equal to $$\frac{0.39}{8.5}$$

or 4.6% of the total sieve-plate area. This hole area may be used for all succeeding sieve-plates until $\sqrt{K}$ = 6.2, when $\sqrt{K_s}$ will equal 0.046 × 6.2 or 0.285; however, since the lowest value of $\sqrt{K_s}$ (at zero plate number) is 0.345 a closer correlation may be attained by utilizing a second approximation method resembling that of the first example.

Because there is a greater number of plates remaining in this case than in the former example the minimum permissible value of $\Delta pd$ (0.25 in. of water) may be chosen for the bottom-most plate of the column whereupon the corresponding value of $\sqrt{K}$ will be 6.2.

The sieve-plate hole area at plate No. 1 will then be $$\frac{0.345}{6.2}$$

or 5.5%. If this value of hole area is used for all plates up to, and including, plate No. 12 the average value of $\sqrt{K}$ will be 7.1, which is reasonably close to the optimum average value of 7.4 required to maintain an average $\Delta pd$ of 0.35 in. of water.

The disposition of sieve-plate hole area in this example will, therefore, be 5.5% of the total sieve-plate area for plates No. 1 through 12, inclusive, and 6.47% of the total sieve-plate area for plates No. 13 through 30, inclusive. This disposition is graphically represented by plot No. 2, Figure 6.

It will be understood that the variation of sieve-hole area in accordance with the variation in the product of the square of the vapor velocity and the vapor density existing at any given point within the column is preferably such that a substantially constant average value of this product is preserved throughout. However, substantially improved separating efficiencies will be attained even if the correlation is not so stricly preserved, as long as the variation in said average product is not permitted to exceed about 50% over the entire column.

As a practical matter, the upper limit of sieve-hole area should not exceed about 15% of the total area of the plates, for the reason that erratic liquid flow patterns usually are created which adversely effect operation above this level. The practical lower limit is determined by economic considerations, since the lower the free area of the sieve-plates the higher will be the total cost of a column designed for a fixed output of product, other conditions remaining unchanged. A practical lower limit of sieve-hole area will therefore not be less than about 3% of the total area of the plates. The practical range for variation of sieve-hole area in accordance with this invention will thus extend from about 3% as the lower limit to 15% as the upper limit.

It will be apparent from the foregoing that the controlled distillation separation of the components of perfect liquid mixtures in accordance with this invention differs in a number of important respects from my former invention disclosed in U. S. Patent 2,201,502. These differences may be summarized in the following comparison:

| U. S. Patent 2,201,502, Relating to Imperfect Liquid Mixtures | The Instant Invention Relating to Perfect Liquid Mixtures |
|---|---|
| (1) Sieve-plates of reduced hole area may be located at either the top or the bottom of the distillation column, depending on the characteristics of the individual components of the imperfect solutions. | (1) Sieve-plates of reduced hole area are always located at the bottom of the column. |
| (2) This invention is applicable to continuous distillation only. | (2) This invention is applicable to both batch operation and continuous operation alike. |
| (3) The hole area is altered to maintain sieve-plate operating stability without excessive liquid entrainment. | (3) The hole area is altered to maintain sieve-plate operating stability with a minimum of pressure drop across each individual sieve-plate. |
| (4) The variations in hole area between succeeding groups of sieve-plates are usually in increments of 1%. | (4) The variations in hole area between succeeding groups of sieve-plates are seldom in increments of 1%. |
| (5) This invention is directed to reducing the differential between the maximum and minimum value of $V^2d$ to less than about 50%. | (5) The regulation of this invention is not limited to the maintenance of any particular degree of variation in the product $V^2d$. |
| (6) The expression $V^2d=K$ is substantially satisfied. | (6) The value of K is deliberately varied within predetermined limits to effect the regulation sought. |

The present invention is particularly applicable to the separation of the components of isomeric mixtures of the nitrotoluenes, chloronitrotoluenes, chloronitrobenzenes, chlorophenols, chlorotoluenes, and dinitrobenzenes, which are all heat-sensitive materials requiring distillation under carefully controlled conditions of temperature and pressure. This invention is also applicable to the separation of isomers which are not inherently heat-sensitive, such as the xylenes, for example, and in such distillations it is not necessary to confine operations to subatmospheric pressures. However, it will be understood that this invention is not limited to the resolution of isomeric mixtures alone but has general application to all perfect liquid systems where there is a substantial pressure drop over the column and particularly where heat sensitivity of the materials is an important factor in the separation. For instance, the invention may be used to separate nitrotoluenes from chloronitrotoluenes, aniline from nitrobenzenes, toluidines from nitrotoluenes, and many other substances which come within the definition of perfect liquids as set forth herein. Also, this invention may be used to effect the separation of intermixed isotopes, such as, for instance, deuterium oxide, or so-called "heavy water," from ordinary water.

Furthermore, although the examples set forth herein specifically relate to binary mixtures, this invention is also applicable to ternary and even more complex mixtures. In the case of multicomponent mixtures higher than binary, however, it is necessary to separate one of the components as the pure fraction while the other fraction will constitute a mixture of the several remaining constituents. This latter fraction may then be further resolved in succeeding distillations which will each separate at least one more component, until the mixture is binary when both of the remaining components will be simultaneously separated as a top and a bottom fraction.

From the foregoing detailed description of my invention it will be apparent that wide variations and modifications may be made within the scope and spirit of the illustrations given, and I intend to be limited thereto only as indicated in the following patent claims.

I claim:
1. A fractionating column for fractionating perfect solutions which are capable of separation by fractional distillation, said column comprising sieve-plates having the hole area varied from a minimum at the bottom of said column to a maximum at the top of said column substantially in accordance with the variation of the ratio of $\sqrt{K_s}$ to $\sqrt{K}$, wherein $K_s$ is equal to the product of the square of the superficial vapor velocity and the existing vapor density and K is equal to the product of the square of the velocity of the vapor passing through the holes and the existing vapor density, to thereby maintain a relatively low and substantially equal pressure drop across each of the several sieve-plates of the column.

2. A fractionating column for fractionating perfect solutions which are capable of separation by fractional distillation, said column comprising sieve-plates having the hole area varied from a minimum at the bottom of said column to a maximum at the top of said column to establish a resistance to vapor passage through each of said sieve-plates substantially equal to the average liquid head plus a dry plate resistance corresponding to a value of $\sqrt{K}$ ranging from about 6.2 to about 8.5, where K is equal to the product of the square of the velocity of the vapor passing through the holes and the vapor density existing at the location of each of said plates.

3. The method of fractionation of perfect solutions which are capable of separation by fractional distillation in a sieve-plate column, which comprises passing the vapors through the sieve-plates having the hole area varied from a minimum at the bottom of said column to a maximum at the top of said column in accordance with the variation of the ratio of $\sqrt{K_s}$ to $\sqrt{K}$, where $K_s$ is equal to the product of the square of the superficial vapor velocity and the existing vapor density, and the value of $\sqrt{K}$ ranges from about 6.2 to about 8.5, to thereby maintain a relatively low and substantially equal pressure drop across each of the several sieve-plates of the column.

4. A fractionating column for fractionating perfect solutions which are capable of separation by fractional distillation, said column comprising sieve-plates having the total hole area varied from a minimum at the bottom of said column to a maximum at the top of said column substantially in accordance with the ratio of $\sqrt{K_s}$ to $\sqrt{K}$, where $K_s$ is equal to the product of the square of the superficial vapor velocity and the existing vapor density, and where the value of $\sqrt{K}$ ranges from about 6.2 to about 8.5, to thereby maintain a relatively low and substantially equal pressure drop across each of the several plates of the column.

CYRUS PYLE.

REFERENCES CITED

The following references are of record in the file of this patent:

UNITED STATES PATENTS

| Number | Name | Date |
|---|---|---|
| 2,020,751 | West | Nov. 12, 1935 |
| 2,201,502 | Pyle | May 21, 1940 |

FOREIGN PATENTS

| Number | Country | Date |
|---|---|---|
| 45,896 | Austria | Jan. 10, 1911 |

Certificate of Correction

Patent No. 2,564,078                                                           August 14, 1951

CYRUS PYLE

It is hereby certified that error appears in the printed specification of the above numbered patent requiring correction as follows:

Column 2, line 33, for "remainer" read *remainder*; column 5, line 59, for "through" read *throughout*; column 8, line 65, for "plate" read *plot*; line 73, for "nitrotolenes" read *nitrotoluenes*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*